(12) United States Patent
Jeddeloh et al.

(10) Patent No.: US 6,330,647 B1
(45) Date of Patent: Dec. 11, 2001

(54) MEMORY BANDWIDTH ALLOCATION BASED ON ACCESS COUNT PRIORITY SCHEME

(75) Inventors: Joseph M. Jeddeloh, Minneapolis; Douglas A. Larson, Lakeview, both of MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/386,973

(22) Filed: Aug. 31, 1999

(51) Int. Cl.[7] .......................... G06F 12/14; G06F 13/18; G06F 9/00; G06F 3/00
(52) U.S. Cl. ..................... 711/158; 711/151; 711/152; 711/162; 709/103; 710/40
(58) Field of Search ....................... 711/119, 130, 711/145, 147, 151, 152, 154, 158, 163; 709/102, 103, 104, 105; 710/22, 25, 28, 35, 40, 45, 54; 712/233, 239, 241

(56) References Cited

U.S. PATENT DOCUMENTS

| 5,212,795 | * | 5/1993 | Hendry | 710/28 |
| 5,241,644 | * | 8/1993 | Nomura et al. | 710/54 |
| 5,666,516 | * | 9/1997 | Combs | 711/163 |
| 5,727,150 | * | 3/1998 | Laudon et al. | 709/215 |
| 5,765,197 | * | 6/1998 | Combs | 711/164 |
| 5,960,468 | * | 9/1999 | Paluch | 711/219 |
| 5,987,574 | * | 11/1999 | Paluch | 711/158 |
| 6,006,303 | * | 12/1999 | Barnaby et al. | 710/244 |
| 6,024,472 | * | 2/2000 | James et al. | 711/147 |
| 6,032,232 | * | 2/2000 | Lindeborg et al. | 711/149 |
| 6,035,377 | * | 3/2000 | James et al. | 711/147 |
| 6,035,378 | * | 3/2000 | James | 711/147 |

* cited by examiner

Primary Examiner—Matthew M. Kim
Assistant Examiner—B. R. Peugh
(74) Attorney, Agent, or Firm—Trop, Pruner & Hu, P.C.

(57) ABSTRACT

A technique to arbitrate computer memory request signals includes selecting a first memory request signal (associated with a first requestor), associating an access count value with the first memory request signal, and allowing the first memory requestor to access the computer memory access count value consecutive times.

19 Claims, 4 Drawing Sheets

MEMORY BANDWIDTH ALLOCATION BASED ON ACCESS COUNT PRIORITY SCHEME

BACKGROUND

The invention relates generally to computer system memory access operations and, more particularly, to the allocation of memory access bandwidth based on an access count priority scheme. Each device requesting access to system memory may be assigned an access count—the value of which determines the number of consecutive memory access cycles the device may use before a different device is allowed an opportunity to access memory.

Many current computer systems employ memory sharing architectures in which a plurality of devices share access to, and use of, a common system memory resource. For example, the system memory of a personal computer (PC) is typically shared by one or more central processing units (CPUs), one or more Accelerated Graphics Port (AGP) devices, one or more Peripheral Component Interconnect (PCI) devices, one or more Universal Serial Bus (USB) devices, and one or more embedded devices such as bus-to-bus bridge circuits and digital signal processors.

In some prior art computer systems, memory access is controlled by a memory control device which arbitrates between various requestors (i.e., devices seeking access to system memory) in a round-robin fashion. In these systems, a first requester is granted a single access followed by a second requester and so on. When all requesters have been granted access once, the process repeats. A drawback to conventional round-robin based arbitration schemes is that it may take a unacceptably long time to completely service/satisfy a requester having a multiple memory access transaction. In some other prior art computer systems, memory access is controlled by a memory control device which arbitrates between various requestors based on a requestor's assigned priority. In these systems, higher priority requesters are favored over lower priority requestors. A drawback to conventional priority based arbitration schemes is that high priority requesters may block lower priority requesters from gaining access to system memory for an unacceptably long time.

As the number of devices issuing memory access requests increases, it becomes ever more important to allocate memory bus bandwidth (i.e., share system memory) in an efficient manner. Thus, there is a need for a memory access control technique that efficiently services requestors issuing multiple access transactions without denying access to those requestors issuing single access transactions and/or low priority requesters for an unacceptably long time.

SUMMARY

In one embodiment the invention provides a method to arbitrate computer memory request signals. The method includes selecting a first memory request signal (associated with a first requestor), associating an access count value with the first memory request signal, and allowing the first memory requester to access the computer memory access count value consecutive times. The method may be stored in any media that is readable and executable by a programmable control device.

In another embodiment, the invention provides a computer memory access control device comprising a memory controller to access a computer memory, a storage element adapted to receive an access count value, and an arbiter coupled to the memory controller and the storage element, the arbiter adapted to selectively couple one of a plurality of memory request signals to the memory controller for N consecutive memory access operations, wherein N is based on the access count value.

DETAILED DESCRIPTION

Techniques (including methods and devices) to allocate memory access bandwidth based on an access count priority scheme are described. Each device/process capable of requesting system memory access (hereinafter referred to as a requestor) may be assigned an access count value. A requestor's access count value determines the number of consecutive memory access cycles it may use before a different device is allowed to access memory. The following embodiments of the invention are illustrative only and are not to be considered limiting in any respect.

Figure 1:
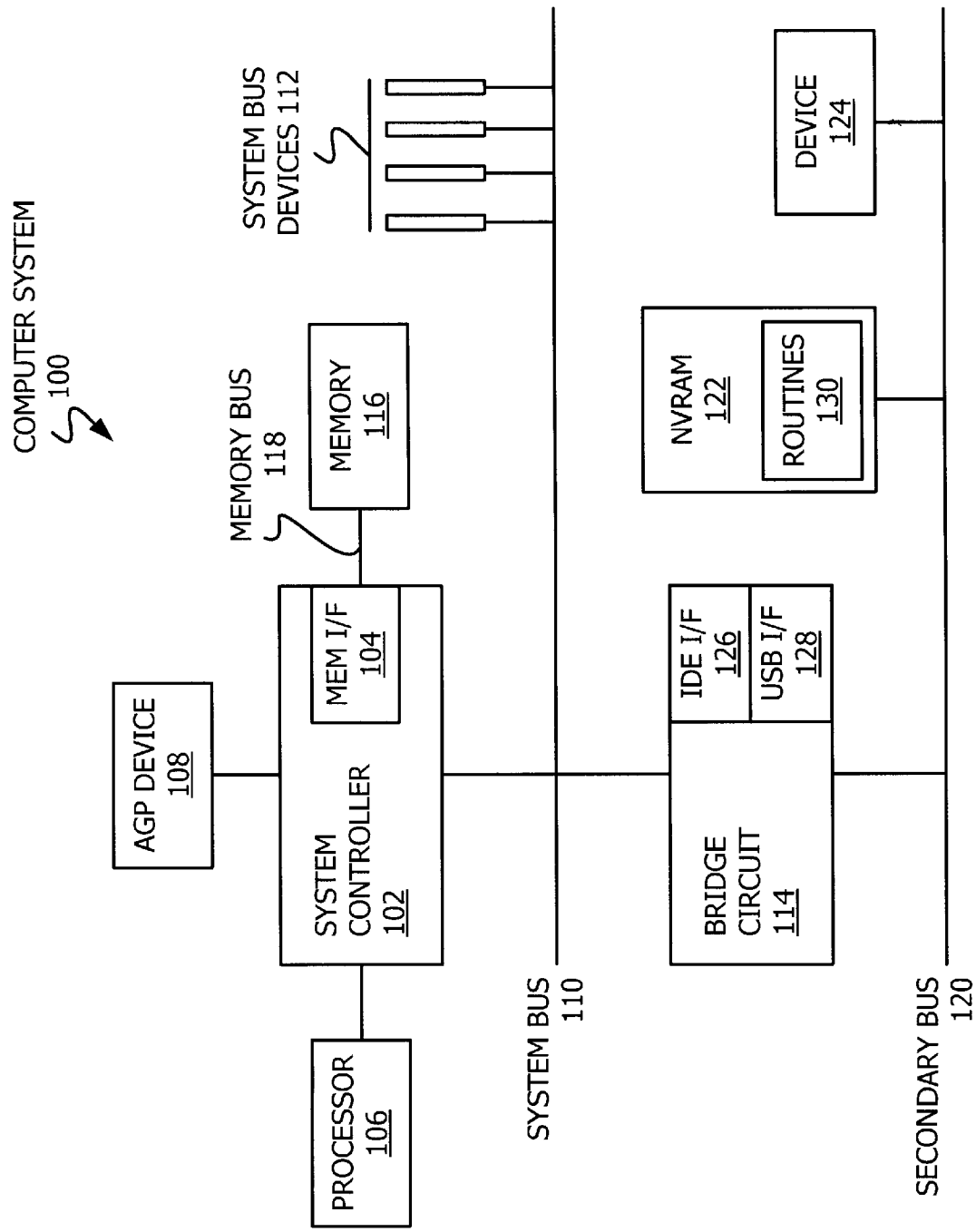
FIG. 1 shows a block diagram of a computer system in accordance with one embodiment of the invention.

FIG. 1 shows a block diagram of computer system 100 incorporating system controller 102 and memory interface 104 in accordance with one embodiment of the invention. As shown, system controller 102 couples processor 106, accelerated graphics port (AGP) device 108, system bus 110 and devices connected thereto (e.g., devices 112 and secondary bus bridge circuit 114) to system memory 116 (via memory bus 118). In turn, secondary bus bridge circuit 114 provides a mechanism to couple secondary bus 120 and attached devices to system memory 116. For example, non-volatile memory 122, and other secondary bus devices (e.g., device 124) such as floppy disks may be coupled directly to secondary bus 122 while one or more intelligent drive electronics (IDE) devices may be coupled to system 100 via IDE interface 126, and one or more universal serial bus (USB) devices may be coupled to system 100 via USB interface 128.

In one embodiment of the invention, memory interface 104 determines an access count value for each requester that may access system memory 116. In another embodiment, memory interface 104 determines an access count value for each type of requestor that may access system memory 116. For example, all processors (e.g., processor 106) may be assigned a common access count value as may all AGP devices (e.g., device 108). In yet another embodiment, some devices (e.g., a specific processor or a specific primary bus device) may have specifically assigned access count values while other devices may have assigned access count values based on their type. Regardless of which approach is taken to assign access count values with a particular requester, once a device is granted access to memory 116 by memory interface 104 (based on any selected arbitration scheme—priority based or round-robin, for example), a requestor may access system memory 116 up to N consecutive times (where N equals the requestor's assigned access count value) before another requestor is granted access.

Generally speaking, requesters may be assigned access count values commensurate with their natural memory transaction size. For example, requests initiated by processor 106 are typically for a cache line's worth of data (e.g., 256 bits or 32 bytes). Thus, a processor requestor may be assigned a access count value sufficient to transfer 32 bytes of data between itself and system memory. Thus, if system memory 116 is accessed via 64-bit (32-bit) words, a processor requestor may be assigned an access count value of 4 (8). Similarly, block devices such as graphics devices (e.g., AGP device 108 and one or more system bus devices 112) may naturally initiate memory transactions of 8 kilobytes (KB). These devices may be assigned access count values sufficient to transfer 8 KB.

Referring again to FIG. 1, illustrative processors (e.g., processor 106) include the PENTIUM® processor and 80×86 families of processors from Intel Corporation. An illustrative system bus (e.g., bus 110) is one operated in conformance with the Peripheral Component Interconnect (PCI) specification. Illustrative primary bus devices 112 include audio, network interface, video and graphics accelerator PCI expansion card devices. An illustrative secondary bus bridge circuit (e.g., bridge circuit 114) is the PIIX4 PCI-to-ISA/IDE accelerator chip from Intel Corporation. Illustrative secondary buses (e.g., bus 120) include those bus structures operated in conformance with the Low Pin Count (LPC) interface, Industry Standard Architecture (ISA) and Extended Industry Standard Architecture (EISA) standards. Illustrative non-volatile memory devices (e.g., NVRAM 126) include read only memory (ROM), electrically programmable read only memory (EPROM), electrically erasable programmable read only memory (EEPROM), flash memory, and complementary metal oxide semiconductor (CMOS) memory. Illustrative secondary bus devices (e.g., device 128) include input-output device controllers, audio and modem devices. It will be recognized that each of the elements of FIG. 1 are typically connected, directly or indirectly, to a printed circuit board often referred to as a motherboard. It will be further recognized that motherboards often include embedded devices (a digital signal processor, for example) that may communicate with system memory 116 via system controller 102.

Figure 2:
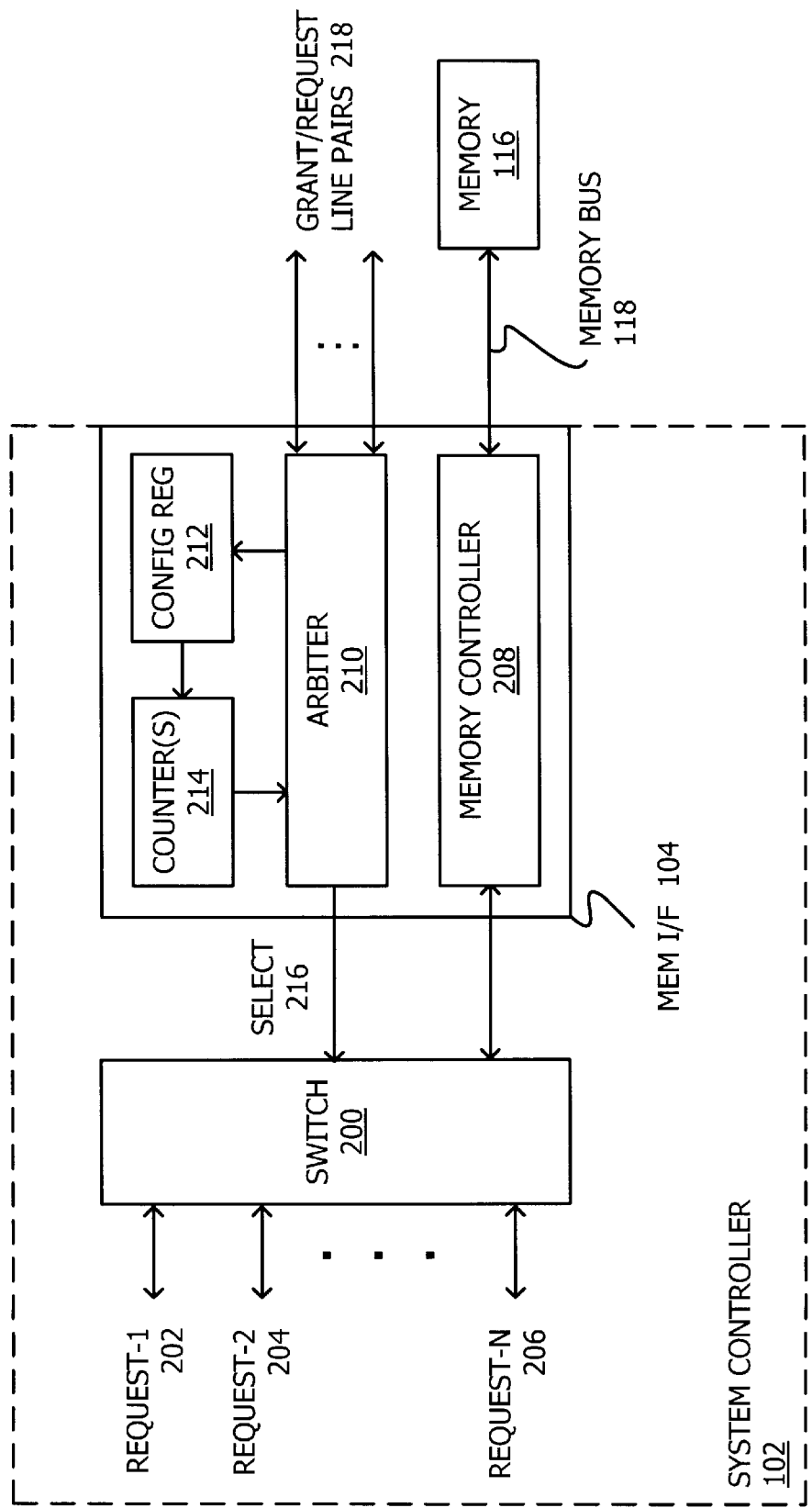
FIG. 2 shows an expanded block diagram of a memory interface circuit in accordance with FIG. 1.

FIG. 2 shows system controller 102 and an expanded block diagram of memory interface 104 in accordance with one embodiment of the invention. As indicated, switch 200 may be used to route memory request signals 202 through 206 between requesting devices and memory interface 104. Each request signal represents a signal path between system controller 102 and a requesting device (e.g., processor 108 and secondary bus device 124). It will be recognized that memory request signals (e.g., 202) typically encode information identifying the device issuing the memory request, the amount of memory being requested (to read or write), a memory transaction address, and other information as needed by other system controller functions.

Memory interface 104 includes memory controller 208, arbiter 210, configuration register 212, and one or more counters 214. Memory controller 208 processes selected memory access request signals, transferring data into and out of memory 116 in accordance with conventional memory controller operations. Arbiter 210 determines which request signal (via select signal 216) is routed by switch 200 to memory controller 208 for processing. In one embodiment, arbiter 210 implements a grant-request handshake protocol wherein each device that may access memory 116 has a corresponding grant/request signal pair 218. Using a chosen arbitration scheme (e.g., a priority-based or round-robin scheme), arbiter 210 monitors grant/request signals 218 and, in combination with configuration registers 214 and counters 216 selectively passes one request signal at a time between switch 200 and memory controller 208. Configuration registers 212 may be used to record access count values for each requestor (or class of requester), and counters 214 may be used by arbiter 210 to track the number of memory access operations remaining for a selected requestor.

Figure 3:
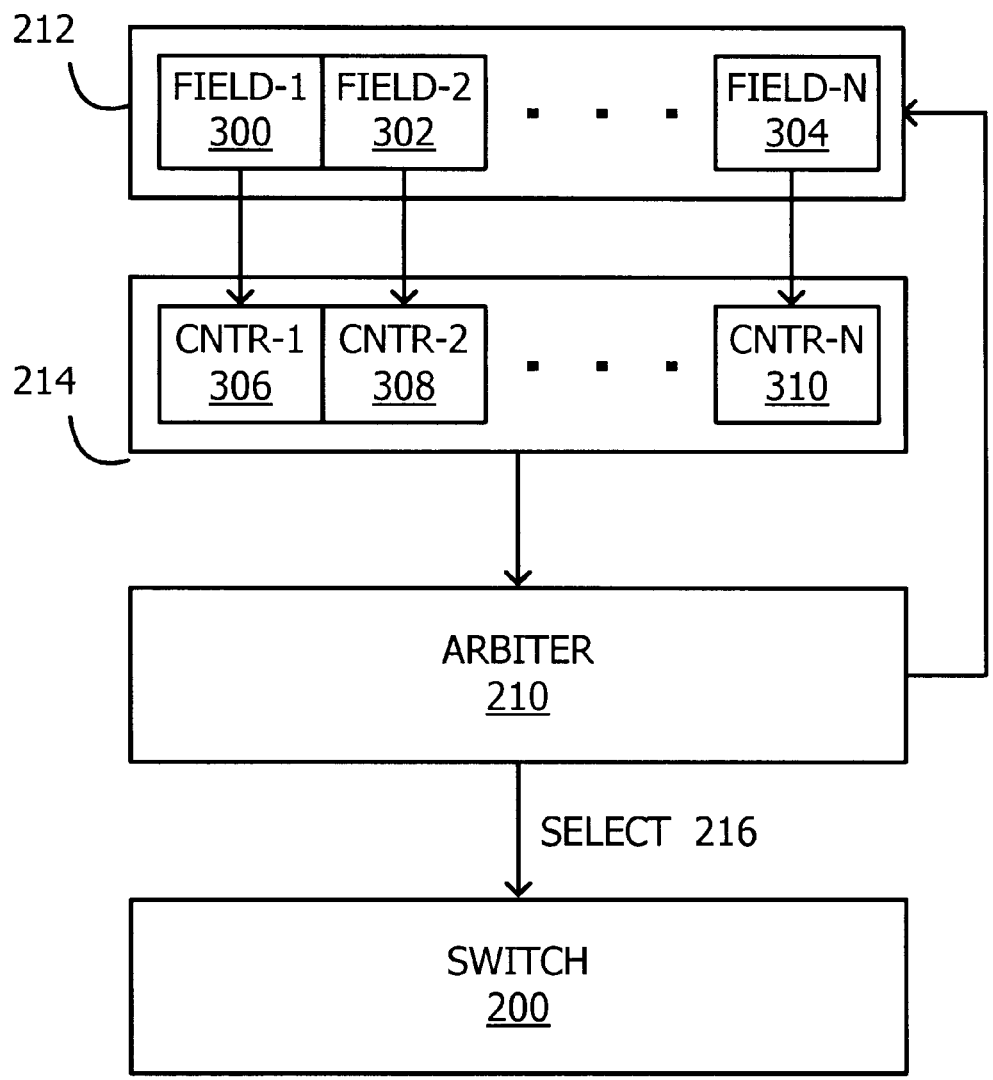
FIG. 3 shows an expanded block diagram of the configuration register and counters of FIG. 2.

As shown in FIG. 3, configuration register 212 may have a plurality of fields, each field adapted to store an access count value for a single requestor. For example, field-1 300 may record an access count value for processor 106, field-2 302 may record an access count value for AGP device 108 and field-N 304 may store an access count value for secondary bus device 124. Counters (e.g., 306, 308 and 310) are used by arbiter 210 to track the number of memory access operations that remain allocated to a selected requestor. Each access by a requestor causes its associated counter value to be decremented. When the counter reaches 0 (zero), or the requester deasserts its request signal (on grant/request signal pairs 218), arbiter 210 performs an arbitration cycle— selecting a different requestor or the same requestor (depending upon the arbitration scheme). In one embodiment (see FIG. 3), the number of counters may equal the number of access count value fields in configuration register 212. In another embodiment, there are fewer counters than there are access count value fields in configuration register 212. For example, counter 214 may comprise a single counter which is loaded with the appropriate configuration field value when a device is initially selected, decremented each access thereafter, and reloaded when another device is selected by arbiter 210.

Figure 4:
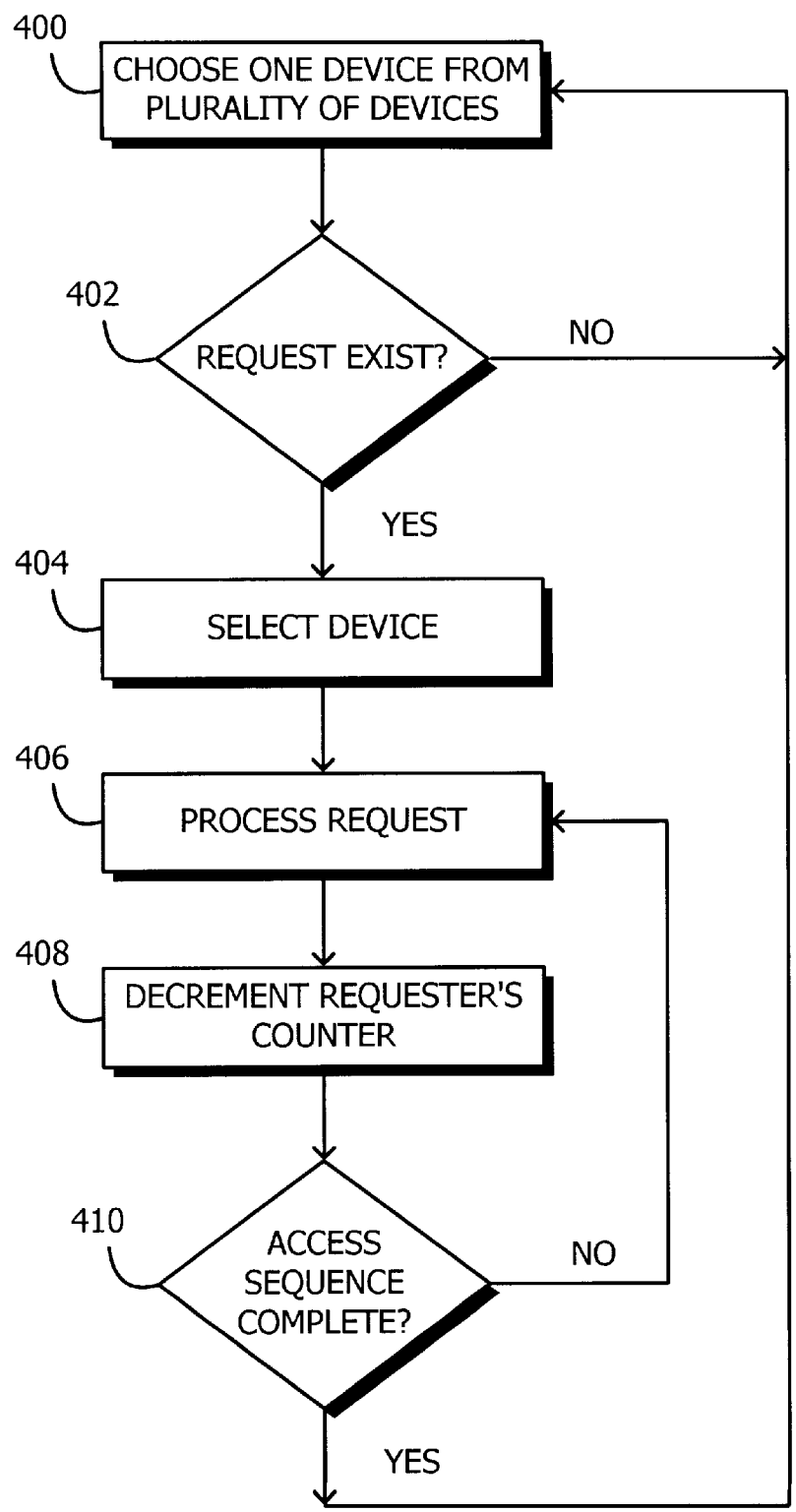
FIG. 4 shows a flowchart of memory interface processing in accordance with one embodiment of the invention.

A flowchart of memory interface processing in accordance with one embodiment of the invention is shown in FIG. 4. Arbiter 210 initially chooses one device from the plurality of devices that may access memory 116 (block 400). Arbiter 210 may, for example, implement a round-robin arbitration mechanism in which requestors are chosen during block 400 in a predetermined and cyclic pattern. If the chosen device does not have a pending memory request (the 'no' prong of diamond 402), the next requestor is chosen and processing continues at block 400. If the chosen device has a pending memory request (the 'yes' prong of diamond 402), arbiter 210 selects the chosen device by loading the access count value associated with the selected device from configuration register 212 to counter 214, and causing switch 200 to couple the selected requestor (request signal 204, for example) to memory 116 via memory controller 208 (block 404). Memory controller 208 performs a single memory access operation in accordance with the selected memory request (block 406), the requestor's associated counter value is decremented (block 408), and a check is made to determine if the selected device has completed all of its allocated consecutive accesses (diamond 410). If the selected device's counter value is zero, or the selected device deasserts it memory request signal (the 'yes' prong of diamond 410), processing continues at block 406. If the selected associated device's counter value greater than zero (the 'no' prong of diamond 410), processing continues at block 406.

In one embodiment, configuration register 212 is initialized during computer system power on self-test (POST) operations by basic input-output system (BIOS) routines 130 (see FIG. 1). For example, if system bus 110 is a PCI bus, configuration register 212 may reside in PCI configuration address space. (Techniques to read and write to PCI configuration space registers are well-known to those of ordinary skill in the art of system controller and memory controller design.) In another embodiment, requester access count values may be determined dynamically at computer system start up and/or modified during system operations. For example, access count values may be based on requestor operating speed, wherein faster devices are allocated larger access count values. Alternatively, system controller 102 or memory interface 104 may monitor (snoop) memory bus 118 activity and empirically set and adjust requestor access count values (i.e., modify values stored in configuration register 212)—wherein the more frequently a requester seeks to access memory 116 (relative to other requesters), the larger its access count value is set.

Various changes in the materials, components, circuit elements, as well as in the details of the illustrated operational method are possible without departing from the scope of the claims. For instance, the illustrative system of FIGS. 1 and 2 show memory interface 104 as being one element within system controller 102. While many current personal computer systems do employ integrated system and memory controllers (often referred to as a "north bridge"), a memory interface in accordance with the invention may be implemented as a stand-alone circuit. That is, memory interface 104 may be implemented as one or more custom designed state machines, embodied in a hardware device such as a printed circuit board comprising discrete logic, integrated circuits, or specially designed application specific integrated circuits (ASICs). In addition, a requestor may have different access count values for read and write memory transactions. That is, configuration register 212 may provide two fields per requestor—one field adapted to store a read operation access count value and another field adapted to store a write operation access count value.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A computer memory arbitration method, comprising:
    selecting a first memory request signal, the first memory request signal associated with a first requestor;
    associating an access count value with the first memory request signal; and
    allowing the first memory requestor to access the computer memory access count value consecutive times.

2. The method of claim 1, wherein the act of associating an access count value with the first memory request signal comprises retrieving an access count value associated with the first requestor.

3. The method of claim 1, wherein the act of associating an access count value with the first memory request signal comprises retrieving an access count value associated with a class of requesters, the class of requestors including the first requestor.

4. The method of claim 1, wherein the act of associating an access count value with the first memory request signal comprises:
    retrieving the access count value from a first location; and
    storing the retrieved access count value in a second location, wherein the second location is adapted to be decremented.

5. The method of claim 4, wherein the act of allowing the first memory requestor to access the computer memory comprises decrementing the value stored in the second location as each memory access operation is performed.

6. The method of claim 1, further comprising selecting a second memory request signal, the second memory request signal associated with a second requestor.

7. The method of claim 6, wherein the second memory request signal is selected in accordance with a round-robin arbitration scheme.

8. The method of claim 6, wherein the second memory request signal is selected in accordance with a priority arbitration scheme.

9. The method of claim 6, wherein the second memory request signal is associated with the first requestor.

10. A program storage device, readable by a programmable control device, comprising:
    instructions stored in the program storage device for causing the programmable control device to
        select a first memory request signal, the first memory request signal associated with a first requester;
        associate an access count value with the first memory request signal; and
        allow the first memory requester to access a computer memory access count value consecutive times.

11. The program storage device of claim 10, wherein the program storage device comprises an integrated circuit memory device and the programmable control device comprises a memory arbiter state machine.

12. A computer system comprising:
    a computer memory;
    a processor; and
    a memory control device coupled to the computer memory and the processor, said memory control device adapted to
        select a first memory request signal, the first memory request signal associated with a first requestor,
        associate an access count value with the first memory request signal, and
        allow the first memory requestor to access a computer memory access count value consecutive times.

13. The computer system of claim 12, further comprising:
    a bus coupled to the memory control device; and
    one or more devices coupled to the bus, each of said one or more devices adapted to request access to the computer memory.

14. A computer memory access control device, comprising:
    a memory controller to access a computer memory;
    a storage element adapted to receive an access count value; and
    an arbiter coupled to the memory controller and the storage element, the arbiter adapted to selectively couple one of a plurality of memory request signals to the memory controller for N consecutive memory access operations, wherein N is based on the access count value.

15. The computer memory access control device of claim 14, N equals the access count value.

16. The computer memory access control device of claim 14, wherein the storage element is adapted to receive a plurality of access count values.

17. The computer memory access control device of claim 16, wherein each of the plurality of access count values corresponds to a specified memory requestor.

18. The computer memory access control device of claim 16, wherein each of the plurality of access count values corresponds to a class of memory requestors.

19. The computer memory access control device of claim 14, wherein the storage element is adapted to receive a single access count value.

* * * * *